United States Patent
Shin et al.

(10) Patent No.: US 8,228,020 B2
(45) Date of Patent: Jul. 24, 2012

(54) APPARATUS AND METHOD FOR CONTROLLING HYBRID MOTOR

(75) Inventors: Dong-Ryul Shin, Busan (KR); Pyeong-Hun Cho, Cheongju-si (KR)

(73) Assignee: Eni Co., Ltd., Ulsan (KR)

( * ) Notice: Subject to any disclaimer, the term of this patent is extended or adjusted under 35 U.S.C. 154(b) by 326 days.

(21) Appl. No.: 12/159,643

(22) PCT Filed: Jan. 10, 2007

(86) PCT No.: PCT/KR2007/000172
§ 371 (c)(1),
(2), (4) Date: Jun. 30, 2008

(87) PCT Pub. No.: WO2007/081153
PCT Pub. Date: Jul. 19, 2007

(65) Prior Publication Data
US 2009/0072776 A1    Mar. 19, 2009

(30) Foreign Application Priority Data
Jan. 10, 2006   (KR) .................. 10-2006-0002903

(51) Int. Cl.
*H02P 23/00* (2006.01)
(52) U.S. Cl. ............... 318/799; 318/400.37; 318/786; 318/711; 318/712; 318/798; 318/700; 310/154.02; 310/191; 310/199; 310/181; 310/173; 310/179; 310/180
(58) Field of Classification Search .......... 310/156.1, 310/184, 154.02, 191, 199, 181, 173, 179, 310/180; 318/400.37, 400.01, 799, 800, 318/801, 803, 823, 700, 711, 712, 186, 798
See application file for complete search history.

(56) References Cited

U.S. PATENT DOCUMENTS

| 3,940,670 A * | 2/1976 | Tanikoshi ............ 318/400.06 |
|---|---|---|
| 4,882,524 A * | 11/1989 | Lee .................... 318/400.4 |
| 5,111,095 A * | 5/1992 | Hendershot ............... 310/168 |
| 5,481,166 A * | 1/1996 | Moreira ............... 318/400.04 |
| 5,729,102 A * | 3/1998 | Gotou et al. .......... 318/400.13 |
| 6,359,401 B1 * | 3/2002 | Garcia-Sinclair et al. . 318/400.4 |
| 6,710,581 B1 * | 3/2004 | Lee ....................... 322/39 |
| 7,064,513 B2 * | 6/2006 | Fenley ................... 318/700 |
| 7,615,905 B2 * | 11/2009 | Rolando Avila Cusicanqui ........... 310/181 |
| 2004/0012354 A1 * | 1/2004 | Krefta et al. ............. 318/439 |
| 2004/0227476 A1 * | 11/2004 | Guerra et al. ............. 318/254 |
| 2005/0007043 A1 * | 1/2005 | Kim ..................... 318/254 |
| 2005/0073279 A1 * | 4/2005 | Fenley ................... 318/717 |

* cited by examiner

Primary Examiner — Rita Leykin

(57) ABSTRACT

An apparatus and method for controlling a hybrid motor, The hybrid motor, uses a permanent magnet instead of a field coil for a rotor, winds a coil round a stator in a multi-phase independent parallel manner, fixes a rectifying type encoder to the rotor and connects a sensor to a driving circuit. The apparatus comprises: an encoder attached to a rotor in cooperation with a pole sensor a speed input unit for generating a speed instruction signal a power switching circuit to generate motor driving signals; a drive module receiving the speed instruction signal and the sensor signal and outputting the speed instruction signal synchronized with the sensor signal as a driving motor signal; a power supply for applying a DC voltage to the power switching circuit; A logic power supply for converting the DC voltage into a logic voltage, and applying logic voltage to the drive module. The motor has n phases, n power switching circuits and n drive modules.

6 Claims, 4 Drawing Sheets

[Fig. 1]
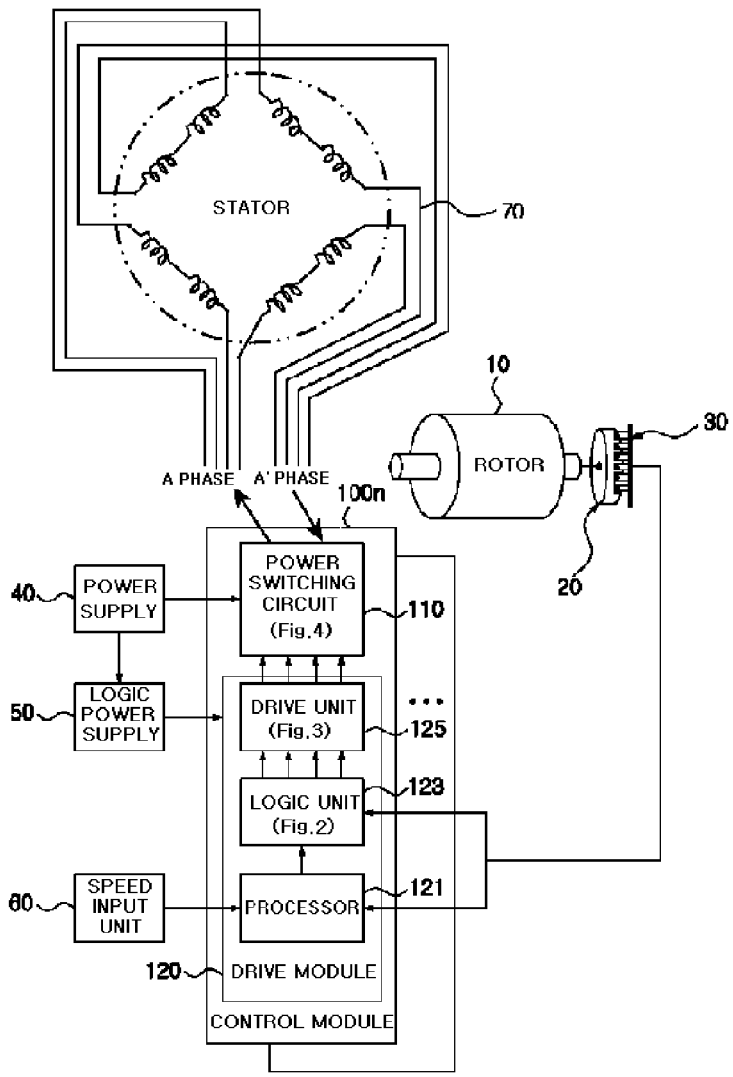
[Fig. 2]
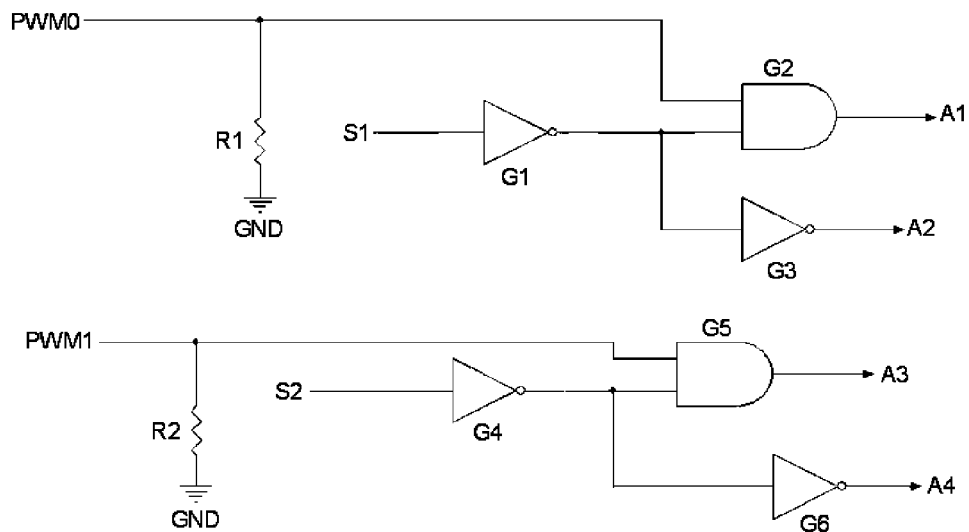

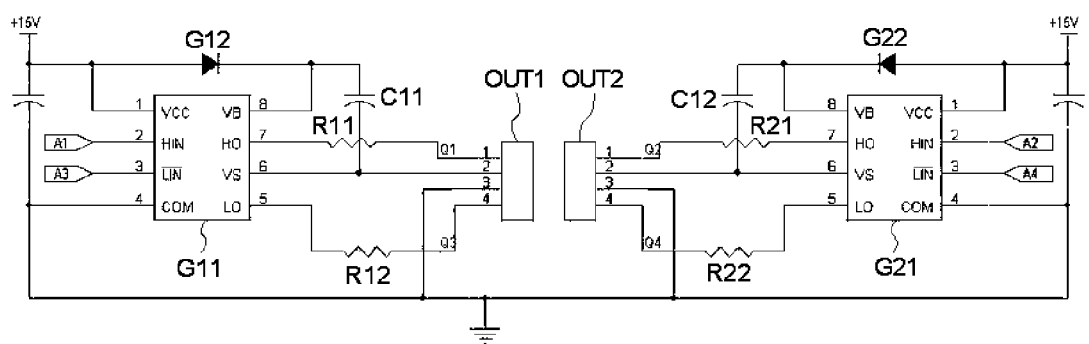
[Fig. 3]
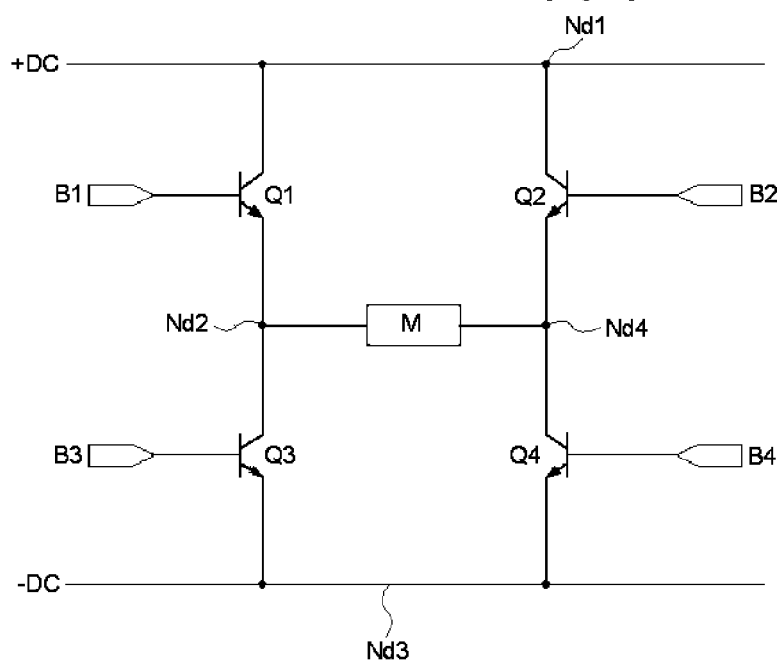
[Fig. 4]

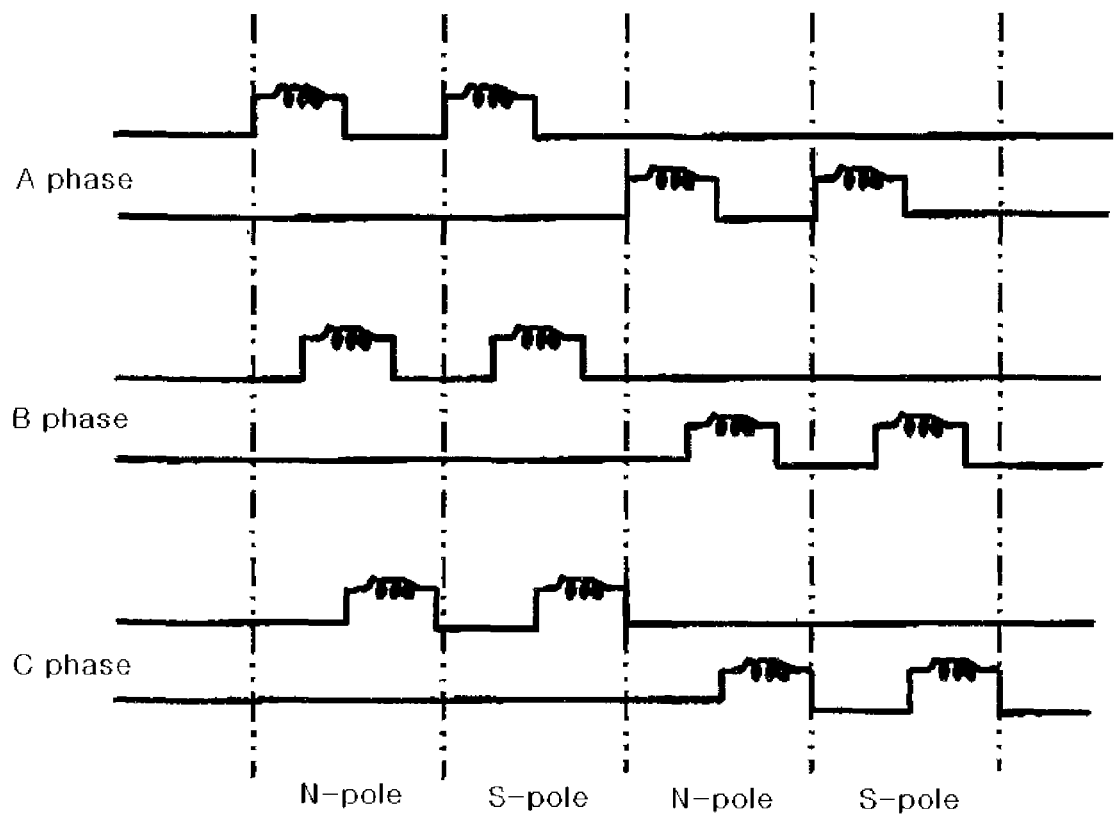

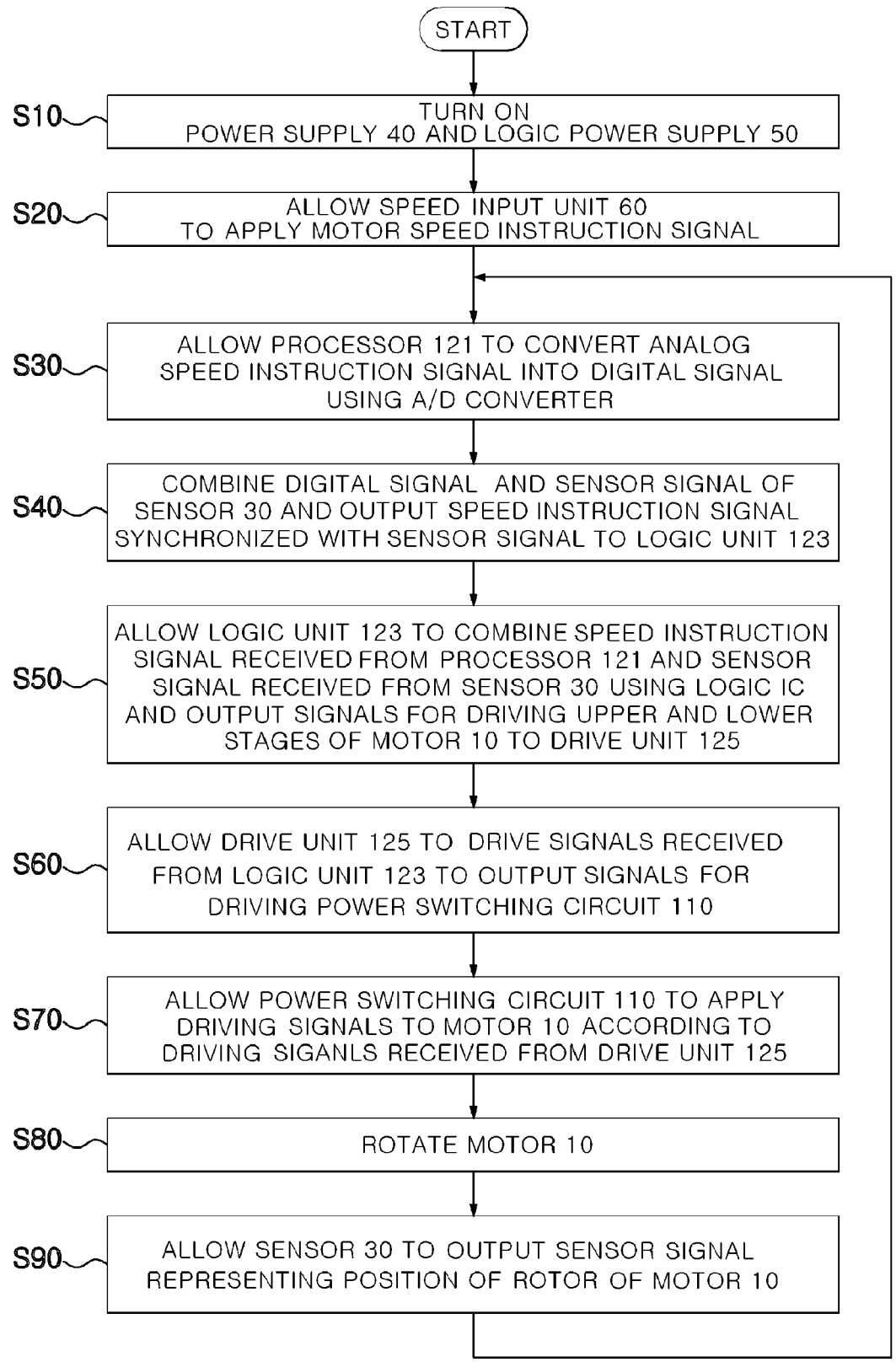

APPARATUS AND METHOD FOR CONTROLLING HYBRID MOTOR

TECHNICAL FIELD

The present invention relates to an apparatus and a method for controlling a hybrid motor, and more particularly, to an apparatus and a method for controlling a hybrid motor, which uses a permanent magnet instead of a field coil for a rotor, winds a coil round a stator in a multi-phase independent parallel manner, fixes a rectifying type encoder to the rotor and connects a sensor to a driving circuit to smoothly start and rotate the hybrid motor. Also, the present invention relates to an apparatus and a method for controlling a hybrid motor in which its configuration is simplified, thereby reducing the manufacturing cost of the hybrid motor.

BACKGROUND ART

A conventional DC motor is constructed in such a manner that a field coil (exciting coil) is wound round a rotor, having an appropriate pole number, and a coil having a brush is wound round the rotor. The conventional DC motor requires the brush to be replaced due to short-circuiting or abrasion of segment bars.

Furthermore, in a conventional AC motor, DC motor and small-capacity BLDC motor, controllers for controlling the operations of these motors are set integrally with the motors, and thus it is difficult to manufacture, repair and maintain the motors. A controller of the conventional AC motor has a large size and is expensive and difficult to control because it executes high-voltage low-current control. A controller of the conventional DC motor performs low-voltage large-current control so that it is difficult to manufacture due to flash phenomenon of the DC motor. In addition, switching elements of the controller of the conventional DC motor is expensive because the controller executes large-current control. Moreover, since the conventional motors generate a surge voltage, reactance, harmonics and so on, the controllers of the conventional motors are difficult to design and expensive.

Furthermore, the conventional integral type controllers cannot independently operate because of characteristics of motors, and thus a system employing a conventional motor is not operated when the motor or its controller is abnormal and the emergency operation of the system cannot be performed.

In addition, a conventional motor control method uses a sine-wave signal, a square-wave signal or a trapezoidal wave signal so that a counter electromotive force is generated when a motor is started and stopped. Thus, it is difficult to construct and control a controller of the motor. Furthermore, when current flows through the controller, arm short of switching elements (switching elements are simultaneously turned on to result in short-circuiting, which destroys the switching elements) is generated. To prevent this, a crossfire prevention circuit must be constructed using hardware or software.

Moreover, the conventional motor control method simultaneously turns on and off switching elements at upper and lower stages of a motor. When the switching elements are simultaneously turned off, remaining power (hysteresis phenomenon) is left in a motor coil. This remaining power and an input voltage cause an abnormal phenomenon such as a surge voltage when the switching elements are turned on. To prevent this, a circuit is constructed using hardware or software, and thus a drive size increases, motor control becomes difficult and the controller becomes expensive.

Furthermore, the conventional motor control method does not require synchronization because it does not use an electronic motor (it uses a closed circuit control method for linear control or constant-speed control). Moreover, linear control is difficult to perform and a high-grade algorithm is required for constant-speed control in the conventional motor control method. In addition, a small-capacity BLDC motor is driven by a sensor signal because it is an electronic motor. However, the small-capacity BLDC motor employs Y wire-connection and delta wire-connection as a wire connecting method so that its speed is controlled using a general AC motor control method. Accordingly, it is difficult to control the speed of the small-capacity BLDC motor.

DISCLOSURE OF INVENTION

Technical Problem

Accordingly, the present invention has been made to solve the above-mentioned problems occurring in the conventional art, and a primary object of the present invention is to provide an apparatus and method for controlling a hybrid motor, which uses a permanent magnet instead of a field coil for a rotor, winds a coil round a stator in a multi-phase independent parallel manner, fixes a rectifying type encoder to the rotor and connects a sensor to a driving circuit to smoothly start and rotate the hybrid motor.

Another object of the present invention is to provide an apparatus and a method for controlling a hybrid motor, which can simplify the configuration of the hybrid motor thereby reducing the manufacturing cost of the hybrid motor.

Yet another object of the present invention is to provide an apparatus and a method for controlling a hybrid motor, which constructs a module for controlling the operation of the hybrid motor such that the module can perform independent control for each phase of the motor and be detachably set in the apparatus to replace only the module with a new one when the module is abnormal, thereby easily manufacturing, repairing and maintaining the hybrid motor.

Technical Solution

To accomplish the above objects, according to one aspect of the present invention, there is provided an apparatus for controlling a hybrid motor having a multi-phase independent parallel stator coil, comprising: an encoder attached to a rotor of the hybrid motor and operated in cooperation with a sensor in order to sense a pole of the rotor; the sensor for outputting a sensor signal indicating the pole of the rotor, sensed by the encoder; a speed input unit for generating a speed instruction signal for driving the motor; a power switching circuit for generating signals for driving the motor; a drive module for receiving the speed instruction signal and the sensor signal and outputting the speed instruction signal synchronized with the sensor signal as a signal for driving the motor; a power supply for applying a DC voltage to the power switching circuit; and a logic power supply for converting the DC voltage received from the power supply into a logic voltage and applying the converted logic voltage to the drive module. When the motor has n phases, the motor includes n power switching circuits and n drive modules.

The drive module comprises: a processor for receiving the speed instruction signal and the sensor signal and outputting the speed instruction signal synchronized with the sensor signal; a logic unit for combining the speed instruction signal and the sensor signal using a logic IC and outputting a motor driving signal; and a drive for receiving the motor driving signal from the logic unit and outputting the signals for driving the power switching circuit.

The motor includes a multi-phase independent parallel coil and respective coils for multiple phases have the same exciting condition.

The power supply is configured in the form of a full bridge converter circuit and converts an AC voltage into a DC voltage.

The logic power supply converts the DC voltage received from the power supply into a logic voltage using a DC/DC converter.

The encoder includes a light-shielding part and a light-detecting part formed on an encoder plate.

The processor converts the speed instruction signal in the form of an analog signal into a digital signal using an A/D converter included therein and outputs the digital speed instruction signal whenever the sensor signal is inputted.

The power switching circuit is configured of an H bridge circuit including first, second, third and fourth switching elements. The first, second, third and fourth switching elements preferably use one of a transistor, an IGBT (Insulated Gate Bipolar Transistor) and a MOSFET (Metal Oxide Semiconductor Field Effect Transistor).

The stator coil of the hybrid motor is a multi-phase independent parallel coil.

To accomplish the above objects, according to another aspect of the present invention, there is also provided a method for controlling a hybrid motor, comprising the steps of: converting an AC voltage into a DC voltage, applying the DC voltage to the hybrid motor, converting the DC voltage into a logic voltage and applying the converted logic voltage to the hybrid motor; inputting a motor speed instruction signal of the motor; converting the speed instruction signal into a digital signal, combining the digital speed instruction signal with a sensor signal and outputting the speed instruction signal synchronized with the sensor signal; combining the speed instruction signal and the sensor signal and outputting signals for driving upper and lower stages of the motor; generating signals for driving the motor using the signals for driving the upper and lower stages of the motor; rotating the motor using the driving signals; and generating the sensor signal indicating the pole of a rotor of the motor and allowing the program to return to the step of converting the speed instruction signal into the digital signal to re-perform the step of converting the speed instruction signal into the digital signal.

The motor uses a hybrid control module including a processor for receiving the speed instruction signal and the sensor signal and outputting the speed instruction signal synchronized with the sensor signal, a logic unit for combining the speed instruction signal and the sensor signal using a logic IC and outputting motor driving signals, and a driver for receiving the motor driving signals from the logic unit and outputting signals for driving a power switching circuit.

Accordingly, a permanent magnet instead of a field coil is used for the rotor, a coil is wound round the stator in a multi-phase independent parallel manner, the rectifying type encoder is fixed to the rotor and the sensor is connected to the driving circuit to smoothly start and rotate the hybrid motor.

Advantageous Effects

The apparatus and method for controlling a hybrid motor according to the present invention can reduce power load by distributing power to (n−1) phases and controlling the distributed power when driving the hybrid motor. The present invention constructs an H bridge circuit for each phase, and thus the number of switching elements is increased. However, the hybrid motor can reduce the capacity of a switching element through distributed control (reducing current load of a circuit to (n−1) phases) as compared to the capacity of a switching element of the same grade. Accordingly, the cost of switching elements can be decreased.

Furthermore, the hybrid motor according to the present invention includes independent driving circuits for respective phases by constructing a controller in a module. Accordingly, even when a phase of the hybrid motor is abnormal, the motor can be operated through other normal phases (that is, emergency operation is possible). Moreover, independent controllers for respective phases are constructed so that, when a controller is destroyed by the motor, this controller does not affect other controllers.

Moreover, power (DC power) is applied to the motor using a partial current applying method, and thus an idle period between positive and negative periods in a switching operation prevents crossfire (arm short of switching elements). Accordingly, there is no need to construct a crossfire prevention circuit using hardware or software. That is, current does not flow when the motor is started and stopped and flows only when the motor is operated, and thus a counter electromotive force is not generated.

Furthermore, the present invention can remove a surge voltage and reactance generated when the motor is turned on and off. Accordingly, the size of a motor drive can be reduced as compared to the drive of a conventional AC motor or DC motor.

In addition, the present invention can easily perform linear control and constant-speed control of the hybrid motor by synchronizing a sensor signal with a speed instruction signal PWM and control the position of the motor because there is no speed variation.

Moreover, speed control is carried out using a voltage control method at a low frequency, and thus switching noise can be reduced.

Furthermore, the phase number of the stator and the pole number of the rotor can be reduced or increased if required and the shapes of the stator and the rotor can be freely designed in pan cake, inner rotor, outer rotor or linear shapes. Accordingly, it is possible to design and manufacture a variety of motors for various purposes.

BRIEF DESCRIPTION OF THE DRAWINGS

FIG. 1 illustrates a configuration of an apparatus for controlling a hybrid motor according to the present invention;

FIG. 2 is a circuit diagram of a logic unit 123 illustrated in FIG. 1;

FIG. 3 is a circuit diagram of a drive unit 125 illustrated in FIG. 1;

FIG. 4 is a circuit diagram of a power switching circuit 110 illustrated in FIG. 1;

FIG. 5 illustrates a 3-phase 4-pole of a stator coil of a hybrid motor according to an embodiment of the present invention; and FIG. 6 is a flow chart of a method for controlling a multi-phase brushless DC motor according to the present invention.

DESCRIPTION OF REFERENCE NUMERALS
FOR MAJOR PARTS OF DRAWINGS

10: rotor 20: encoder
30: sensor 40: power supply
50: logic power supply 60: speed input unit
70: stator 100: control module
110: power switching circuit 120: drive module
121: processor 123: logic unit
125: drive unit

MODE FOR THE INVENTION

The present invention will now be described more fully with reference to the accompanying drawings, in which exemplary embodiments of the invention are shown. The invention may, however, be embodied in many different forms and should not be construed as being limited to the embodiments set forth herein.

Rather, these embodiments are provided so that this disclosure will be thorough and complete, and will fully convey the concept of the invention to those skilled in the art. Like reference numerals in the drawings denote like elements, and thus their description will be omitted.

Further objects and advantages of the invention can be more fully understood from the following detailed description taken in conjunction with the accompanying drawings.

Hybrid Motor and Controller

FIG. 1 illustrates a configuration of an apparatus for controlling a hybrid motor according to the present invention. Referring to FIG. 1, the apparatus for controlling a hybrid motor includes a stator 70, a rotor 10, an encoder 20 and a sensor 30 attached to the rotor 10, a power supply 40, a logic power supply 50, a speed input unit 60, a processor 121, a drive module 120 consisting of the processor 121, a logic unit 123 and a drive unit 125, and a control module 100 consisting of the drive module 120 and a power switching circuit 110. When the hybrid motor has n phases, the apparatus for controlling the hybrid motor includes n control modules 100.

The stator 70 of the hybrid motor is configured in the form of an armature and the rotor 10 is configured in the form of a permanent magnet. The rotor can have multiple poles (for example, 2-pole, 4-pole, 6-pole, . . . , 2n-pole) and the stator can have multiple phases (for example, 2-phase, 3-phase, 4-phase, 6-phase, . . . , N-phase). Accordingly, the pole number or the phase number of the hybrid motor can be easily increased or decreased if required and the length, thickness and shape of the hybrid motor can be easily changed if required.

It is preferable that the hybrid motor includes a multi-phase independent parallel coil and respective coils for multiple phases have the same exciting condition.

The encoder 20 set at the rotor 10 of the hybrid motor is attached to an axis of the hybrid motor and operates in connection with the sensor 30 in order to sense the pole of the rotor 10 of the hybrid motor. The encoder 20 has a light-shielding part (not shown) and a light-detecting part (not shown), which are formed on an encoder plate, in order to sense the position of the rotor 10. With these characteristics, the encoder 20 controls the exciting angle of the hybrid motor and allows an input waveform of the hybrid motor to be inputted as a partial wave to the hybrid motor.

The sensor 30 outputs a sensor signal representing the pole (position) of the rotor 10 of the hybrid motor, which is sensed by the encoder 20, to the logic unit 123 and the processor 121. It is preferable that the sensor 30 is a photo-sensor.

The power supply 40 is configured of a full bridge converter circuit such that it directly provides a DC voltage to the logic power supply 50 and the power switching circuit 110 when the DC voltage is inputted and, when an AC voltage is inputted, it transforms the AC voltage into a DC voltage and supplies the DC voltage to the logic power supply 50 and the power switching circuit 110. The present invention can control the speed of the hybrid motor by regulating the voltage of the power supply 40.

The logic power supply 50 converts the DC voltage received from the power supply 40 into a logic voltage using a DC/DC converter in order to use the DC voltage as a logic voltage. The logic voltage is applied to the drive module 120.

The speed input unit 60 inputs a speed instruction signal for driving the hybrid motor. The speed input unit 60 uses a digital switch or an analog switch and applies the speed instruction signal in the form of an analog signal to an A/D converter (not shown) of the processor 121.

The control module 100 includes the power switching circuit 110 and the drive module 120, and the drive module 120 includes the processor 121, the logic unit 123 and the drive 125, as described above.

The processor 121 converts the analog speed instruction signal into a digital signal using the A/D converter (not shown) included therein, receives the sensor signal from the sensor 30 and outputs the digital speed instruction signal whenever the sensor signal is inputted. The speed instruction signal synchronized with the sensor signal is outputted to the logic unit 123 and enables linear control and constant-speed control of the hybrid motor.

The logic unit 123 combines the speed instruction signal received from the processor 121 and the sensor signal received from the sensor 30 using a logic IC and outputs motor driving signals.

To achieve this, the logic unit 123 includes inverters G1, G3, G4 and G6 and AND gates G2 and G5, as shown in FIG. 2. The AND gate G2 receives the speed instruction signal PWM0 from the processor 121 and the sensor signal S1 from the sensor 30 through the inverter G1, performs a logic AND operation on the speed instruction signal PWM0 and the sensor signal S1 and outputs a resultant signal A1. The inverter G3 receives the output signal of the inverter G1, inverts it and outputs an inverted signal A2. The AND gate G5 receives the speed instruction signal PWM1 from the processor 121 and the sensor signal S2 from the sensor 30 through the inverter G4 and performs a logic AND operation on the speed instruction signal PWM1 and the sensor signal S2 and outputs a resultant signal A3. The inverter G6 receives the output signal of the inverter G4, inverts it and outputs an inverted signal A4.

The drive 125 receives the motor driving signals A1, A2, A3 and A4 from the logic unit 123 and outputs signals for driving the power switching circuit 110.

Referring to FIG. 3, the drive 125 includes a first IC chip G11 that receives the motor driving signals A1 and A3 from the logic unit 123 and outputs signals B1 and B3 for driving switching elements Q1 and Q3 of the power switching circuit 110 and a second IC chip G21 that receives the motor driving signals A2 and A4 from the logic unit 123 and outputs signals B2 and B4 for driving switching elements Q2 and Q4 of the power switching circuit 110.

The power switching circuit 110 generates signals for driving the hybrid motor and is configured in the form of an H-bridge circuit using the first, second, third and fourth switching elements Q1, Q2, Q3 and A4, as shown in FIG. 4. It is preferable that the first, second, third and fourth switching elements Q1, Q2, Q3 and Q4 use transistors, IGBTs (Insulated gate Bipolar Transistors) or MOSFETs (Metal Oxide Semiconductor Field Effect Transistors).

When the hybrid motor is a multi-phase motor, the apparatus for controlling the hybrid motor includes n control modules 100 each including the power switching circuits 110 and the drive module 120.

3-Phase 4-Pole of Stator Coil of Hybrid Motor

FIG. 5 illustrates a 3-phase 4-pole of a stator coil of a hybrid motor according to an embodiment of the present invention.

The stator coil of the hybrid motor forms poles (N-pole and S-pole) using the fact that the inflow of current into a coil slot is different from the outflow of current from the coil slot, and correlates with the pole of the rotor to generate a torque.

Method for Controlling Multi-Phase Brushless DC Motor

FIG. 6 is a flow chart of a method for controlling a multi-phase brushless DC motor according to the present invention.

Referring to FIGS. 1 and 6, the power supply 40 transforms an AC voltage into a Dc voltage and applies the DC voltage to the logic power supply 50 and the power switching circuit 110, and the logic power supply 50 converts the DC voltage into a logic voltage and applies the logic voltage to the drive module 120 in step S10.

Then, the speed input unit 60 inputs the speed instruction signal of the hybrid motor to the processor 121 of the drive module in step S20.

The processor 121 converts the speed instruction signal into a digital signal in step S30, combines the speed instruction signal and the sensor signal received from the sensor 30 and outputs the speed instruction signal synchronized with the sensor signal to the logic unit 123 in step S40.

The logic unit 123 combines the speed instruction signal received from the processor 121 and the sensor signal received from the sensor 30 and outputs signals for driving upper and lower stages of the hybrid motor to the drive 125 in step S50.

The drive 125 drives the signals for driving the upper and lower stages of the hybrid motor to output signals for driving the power switching circuit 110 in step S60.

The power switching circuit 110 is switched by the signals received from the drive 125 to output signals for driving the hybrid motor in step S70.

The signals outputted from the power switching circuit 110 rotate the rotor 10 in step S80.

The sensor 30 outputs the sensor signal representing the pole of the rotor 10 of the hybrid motor to the processor 121 and the logic unit 123 to operate the rotor 10 in step S90.

As described above, the apparatus for controlling the multi-phase brushless DC motor combines the sensor signal indicating the pole of the rotor, sensed by the sensor 30, and the speed indicating signal inputted by the speed input unit 60 to generate the speed indication signal synchronized with the sensor signal and generates a motor control signal using the speed indication signal to drive the hybrid motor. Accordingly, square-wave alternating current flows through coils of multiple phases of the hybrid motor to smoothly drive the hybrid motor.

The hybrid motor according to the present invention includes an armature as a stator and a permanent magnet as a rotor. In general, when a solenoid coil is used as a stator coil, a motor generating sine-wave torque ripples can be constructed. Accordingly, the present invention coils the stator coil in a multi-phase independent parallel manner such that the stator coil is suitable for a power motor as a motor generating trapezoidal torque ripples. Furthermore, the present invention minimizes copper loss of an exciting coil and improves the efficiency of the motor by employing a bipolar method. Moreover, the present invention increases utilization efficiency of coils by making a coil have multiple phases (for example, 2-phase 1-excitation, 3-phase 2-excitation, 4-phase 3-excitation, 5-phase 4-excitation, n-phase (n−1)-excitation, n-phase (n−2)-excitation, and so on) to enable compact design and improve torque ripples. In addition, the present invention constructs the encoder and the sensor in a simple and safe manner to improve the starting and rotating characteristics of the motor. Furthermore, the present invention constructs a motor having a simple structure to reduce the manufacturing cost of the motor.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. An apparatus for controlling a hybrid motor having a multi-phase independent parallel stator coil, comprising:

an encoder attached to a rotor of the hybrid motor and operated in cooperation with a sensor in order to sense the pole of the rotor;

the sensor for outputting a first sensor signal and a second sensor signal, each of the first sensor signal and the second sensor signal indicating the pole of the rotor, sensed by the encoder;

a speed input unit for generating a first speed instruction signal and a second speed instruction signal for driving the motor;

a power switching circuit for generating signals for driving the motor, wherein the power switching circuit is configured of an H bridge circuit including a first switching element, a second switching element, a third switching element, and a fourth switching element;

a drive module for receiving the first speed instruction signal, the second speed instruction signal, the first sensor signal and the second sensor signal, and outputting the first speed instruction signal and the second speed instruction signal synchronized with the first sensor signal and the second sensor signal, directly to the power switching circuit as a signal for driving the power switching circuit, wherein the drive module comprises a processor for receiving the first speed instruction signal, the second speed instruction signal, the first sensor signal and the second sensor signal, and a logic unit for combining the first speed instruction signal with the first sensor signal, and the second speed instruction signal with the second sensor signal, and outputting a motor driving signal, and a drive for receiving the motor driving signal from the logic unit and outputting the signals for driving the power switching circuit, wherein the logic unit comprises a first inverter, a second inverter, a third inverter, a fourth inverter, a first AND gate, and a second AND gate, wherein the first AND gate receives the first speed instruction signal from the processor and receives the first sensor signal from the sensor through the first inverter, and performs a logic AND operation on the first speed instruction signal and the inverted first sensor signal, and outputs a first resultant signal, wherein the second inverter inverts the inverted first sensor signal and outputs a second resultant signal, wherein the second AND gate receives the second speed instruction signal from the processor and receives the second sensor signal from the sensor through the third inverter, and performs a logic AND operation on the speed instruction signal and the inverted second sensor signal, and outputs a third resultant signal, wherein the fourth inverter inverts the inverted second sensor signal and outputs a fourth resultant signal, wherein the drive receives the first resultant signal, the second resultant signal, the third resultant signal, and the fourth resultant signal as the motor driving signal from the logic unit, and outputs a first drive output signal, a second drive output signal, a third drive output signal, and a fourth drive output signal to the power switching circuit for driving the power switching circuit, wherein the drive comprises, a first Integrated Circuit (IC) and a second IC, the first IC receiving the first resultant signal and the third resultant signal from the logic unit, and outputting the first drive output signal for driving the first switching element and the third drive output signal for driving the third switching element, the second IC receiving the second resultant signal and the fourth resultant signal from the logic unit, and outputting the second drive output signal for driving the second switching element and the fourth drive output signal for driving the fourth switching element, wherein the H bridge circuit is configured to include the first switching element and the third switching element linearly in a first line and the second switching element and the fourth switching element linearly in a second line, such that the first line and the second line are in parallel position, and wherein the first switching element and the second switching element are facing directly each other, and the third switching element and the fourth switching element are facing directly each other;

a power supply for applying a DC voltage to the power switching circuit; and a logic power supply for converting the DC voltage received from the power supply into a logic voltage and applying the converted logic voltage to the drive module, wherein when the motor has n phases, the motor includes n power switching circuits and n drive modules, and wherein the stator coil forms an N-pole and an S-pole using the fact that the inflow of current into a coil slot is different from the outflow of current from the coil slot, and correlates with the pole of the rotor to generate a torque.

2. The apparatus according to claim 1, wherein the motor includes a multi-phase independent parallel coil and respective coils for multiple phases have the same exciting condition.

3. The apparatus according to claim 1, wherein the encoder includes a light-shielding part and a light-detecting part formed on an encoder plate.

4. The apparatus according to claim 1, wherein the processor converts the speed instruction signal in the form of an analog signal into a digital signal using an A/D converter and outputs the digital speed instruction signal whenever the sensor signal is inputted.

5. The apparatus according to claim 1, wherein the stator coil of the hybrid motor is a multi-phase independent parallel coil.

6. A method for controlling a hybrid motor having a multi-phase independent parallel stator coil, the method comprising the steps of:
(a) transforming an AC voltage into a DC voltage and applying the DC voltage to a logic power supply and a power switching circuit, and converting the DC voltage into a logic voltage and applying the logic voltage to a drive module;
(b) inputting a first speed instruction signal and a second speed instruction signal of the hybrid motor to a processor of the drive module;
(c) converting the first speed instruction signal and the second speed instruction signal into a first digital signal and the second digital signal, combining the first speed instruction signal and a first sensor signal received from a sensor, and the second speed instruction signal and a second sensor signal received from the sensor and outputting the first speed instruction signal synchronized with the first sensor signal and the second speed instruction signal synchronized with the second sensor signal to a logic unit;
(d) combining the first and the second speed instruction signals received from the processor and the first and the second sensor signals received from the sensor and outputting the combined signals to a drive unit;
(e) driving the signals outputted from the drive unit to output signals directly to the power switching circuit for driving the power switching circuit, wherein the power switching circuit is configured of an H bridge circuit including a first switching element, a second switching element, a third switching element, and a fourth switching element, wherein the logic unit comprises a first inverter, a second inverter, a third inverter, a fourth inverter, a first AND gate, and a second AND gate, wherein the first AND gate receives the first speed instruction signal from the processor and receives the first sensor signal from the sensor through the first inverter, and performs a logic AND operation on the first speed instruction signal and the inverted first sensor signal, and outputs a first resultant signal, wherein the second inverter inverts the inverted first sensor signal and outputs a second resultant signal, wherein the second AND gate receives the second speed instruction signal from the processor and receives the second sensor signal from the sensor through the third inverter, and performs a logic AND operation on the speed instruction signal and the inverted second sensor signal, and outputs a third resultant signal, wherein the fourth inverter inverts the inverted second sensor signal and outputs a fourth resultant signal, wherein the drive receives the first resultant signal, the second resultant signal, the third resultant signal, and the fourth resultant signal as the motor driving signal from the logic unit, and outputs a first drive output signal, a second drive output signal, a third drive output signal, and a fourth drive output signal to the power switching circuit for driving the power switching circuit, wherein the drive comprises, a first Integrated Circuit (IC) and a second IC, the first IC receiving the first resultant signal and the third resultant signal from the logic unit, and outputting the first drive output signal for driving the first switching element and the third drive output signal for driving the third switching element, the second IC receiving the second resultant signal and the fourth resultant signal from the logic unit, and outputting the second drive output signal for driving the second switching element and the fourth drive output signal for driving the fourth switching element, wherein the H bridge circuit is configured to include the first switching element and the third switching element linearly in a first line and the second switching element and the fourth switching element linearly in a second line, such that the first line and the second line are in parallel position, and wherein the first switching element and the second switching element are facing directly each other, and the third switching element and the fourth switching element are facing directly each other;

(f) the power switching circuit being switched by the signals from the drive unit to output signal for driving a rotor;
(g) the rotor being rotated by the signals outputted from the power switching circuit, thereby the hybrid motor being rotated; and
(h) outputting the first and the second sensor signals from the sensor, wherein the first and the second sensor signals indicate a pole of the rotor of the motor to return to the step (c), wherein the stator coil forms an N-pole and an S-pole using the fact that the inflow of current into a coil slot is different from the outflow of current from the coil slot, and correlates with the pole of the rotor to generate a torque.

* * * * *